(12) United States Patent
Meshkati et al.

(10) Patent No.: US 8,483,690 B2
(45) Date of Patent: Jul. 9, 2013

(54) TRANSMITTING SUBSTITUTE RESELECTION PARAMETERS

(75) Inventors: Farhad Meshkati, San Diego, CA (US); Vinay Chande, San Diego, CA (US); Mehmet Yavuz, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 12/888,169

(22) Filed: Sep. 22, 2010

(65) Prior Publication Data

US 2011/0237261 A1   Sep. 29, 2011

Related U.S. Application Data

(60) Provisional application No. 61/245,197, filed on Sep. 23, 2009.

(51) Int. Cl.
*H04W 36/08* (2009.01)

(52) U.S. Cl.
USPC ............................ 455/438; 455/450; 370/328

(58) Field of Classification Search
USPC .. 455/438, 450, 458, 507, 522, 525; 370/311, 370/328, 331
See application file for complete search history.

(56) References Cited

U.S. PATENT DOCUMENTS

| 5,546,443 | A | 8/1996 | Raith | |
|---|---|---|---|---|
| 7,480,519 | B2 * | 1/2009 | Jeong et al. | 455/525 |
| 8,271,014 | B2 * | 9/2012 | Gholmieh et al. | 455/522 |
| 2009/0219844 | A1 * | 9/2009 | Soliman | 370/311 |
| 2010/0151870 | A1 * | 6/2010 | Piercy et al. | 455/450 |
| 2010/0203905 | A1 * | 8/2010 | Chaubey et al. | 455/458 |
| 2010/0290389 | A1 * | 11/2010 | Hou et al. | 370/328 |
| 2010/0317386 | A1 * | 12/2010 | Da Silva et al. | 455/507 |
| 2011/0194534 | A1 * | 8/2011 | Carmon et al. | 370/331 |

OTHER PUBLICATIONS

3rd Generation Partnership Project; Technical Specification Group Radio Access Network; Radio Resource Control (RRC); Protocol Specification (Release 8) , 3GPP Standard; 3GPP TS 25.331, 3rd Generation Partnership Project (3GPP), Mobile Competence Centre ; 650, Route Des Lucioles ; F-06921 Sophia-Antipolis Cedex ; France, No. V8.6.0, Mar. 1, 2009, pp. 1-1673, XP050368026.

(Continued)

*Primary Examiner* — Cong Tran

(74) *Attorney, Agent, or Firm* — Florin C. Corie

(57) ABSTRACT

A cell reselection parameter is transmitted on one carrier frequency for a defined period of time to cause access terminals operating on that carrier frequency to more aggressively search for access points on at least one other carrier frequency. For example, a femto cell operating on one carrier frequency may transmit a broadcast channel including a cell reselection parameter such as Sintersearch on another carrier frequency that is used by a macro cell. Here, the value of the cell reselection parameter (e.g., Sintersearch) is chosen so that the access terminals will more aggressively conduct inter-frequency searches. In addition, the cell reselection parameter is transmitted for a period of time that ensures that a nearby access terminal will receive the parameter during its wakeup interval.

66 Claims, 9 Drawing Sheets

OTHER PUBLICATIONS

3rd Generation Partnership Project; Technical Specification Group Radio Access Network; User Equipment (UE) procedures in idle mode and procedures for cell reselection in connected mode (Release 8), 3GPP Standard; 3GPP TS 25.304, 3rd Generation Partnership Project (3GPP), Mobile Competence Centre; 650, Route Des Lucioles; F-06921 Sophia-Antipolis Cedex; France, No. V8.0, Jun. 1, 2009, pp. 1-49, XP050367397.

Intenational Search Report and Written Opion—PCT/US2010/050048—International Search Authority, European Patent Office, Jan. 12, 2011.

* cited by examiner

TRANSMITTING SUBSTITUTE RESELECTION PARAMETERS

CLAIM OF PRIORITY

This application claims the benefit of and priority to commonly owned U.S. Provisional Patent Application No. 61/245,197, filed Sep. 23, 2009, the disclosure of which is hereby incorporated by reference herein.

BACKGROUND

1. Field

This application relates generally to wireless communication and more specifically, but not exclusively, to improving handover performance.

2. Introduction

A wireless communication network may be deployed over a defined geographical area to provide various types of services (e.g., voice, data, multimedia services, etc.) to users within that geographical area. In a typical implementation, macro access points (e.g., corresponding to different cells) are distributed throughout a macro network to provide wireless connectivity for access terminals (e.g., cell phones) that are operating within the geographical area served by the macro network. A macro network deployment is carefully planned, designed and implemented to offer good coverage over the geographical region. Such a careful planning cannot, however, completely accommodate channel characteristics such as path loss, fading, multipath, shadowing, and so on, in indoor environments. Indoor users, therefore, often face coverage issues (e.g., call outages, quality degradation) resulting in poor user experiences.

To supplement conventional network access points (e.g., macro access points), small-coverage access points may be deployed (e.g., installed in a user's home) to provide more robust indoor wireless coverage or other coverage for access terminals. Such small-coverage access points may be referred to as, for example, femto access points, femto cells, home NodeBs, home eNodeBs, or access point base stations. Typically, such small-coverage access points are connected to the Internet and the mobile operator's network via a DSL router or a cable modem. For convenience, small-coverage access points may be referred to as femto cells or femto access points in the discussion that follows.

An unplanned deployment of large numbers of femto cells may present various operational issues. As one example, issues may arise for in-bound idle mobility management of an access terminal from a macro network to a femto cell.

To facilitate in-bound idle mobility, an access terminal conducts searches for signals from nearby access points in an attempt to ensure, for example, that the access terminal will be served by the "best" available access point in that area. For example, as an access terminal roams throughout the geographical area associated with a network, the access terminal may move away from its serving access point. Consequently, signal conditions for the access terminal within a given cell may deteriorate, whereby the access terminal may be better served by another access point in the network. That is, it may be desirable for the access terminal to reselect to another cell (e.g., access point). A typical example would be where a mobile subscriber currently served by a macro cell comes to a location (e.g., the subscriber's home) where a femto cell for that subscriber is deployed.

To ensure that the "best" handover candidate may be readily identified when signal conditions at the current cell deteriorate, an access terminal regularly monitors for signals (e.g., beacon/pilot signals) from nearby access points to identify potential target access points to which the access terminal may be handed-over. In some cases, these access points may operate on a different carrier frequency than the current serving access point. Thus, this search may involve searching on different frequencies (i.e., an inter-frequency search). In some cases (e.g., where the access terminal has a single radio), the access terminal may tune away from its current carrier frequency to conduct such a search. Consequently, the access terminal may miss transmissions from its current serving cell during this search. For these and/or other reasons, a cell may specify certain parameters that are used to control how aggressively (e.g., under what signal conditions) an access terminal performs inter-frequency searches.

Depending on the current macro parameter settings, idle mode mobility management procedures specified in the 3GPP standard may not be triggered at an access terminal that is in the vicinity of a femto cell. As a consequence, an access terminal on a macro network may not be able to discover femto cells on other frequencies.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to transmitting a cell reselection parameter on a carrier frequency for a specified period of time to cause nearby access terminals operating on that carrier frequency to search for access points on at least one other carrier frequency. For example, a femto cell operating on one carrier frequency may transmit a broadcast channel including a cell reselection parameter such as Sintersearch on another carrier frequency that is used by a macro cell. Thus, any access terminals on the macro cell that are in close proximity to the femto cell will receive the broadcast channel from the femto cell rather than the broadcast channel from the macro cell. In the discussion that follows, the broadcast channel transmitted by the femto cell may be referred to as a "clone" broadcast channel. Here, the value of the cell reselection parameter (e.g., Sintersearch) is chosen so that the access terminals on the macro carrier frequency will more aggressively conduct inter-frequency searches. In addition, the cell reselection parameter is transmitted by the femto cell for a period of time that ensures that an access terminal in the vicinity of the femto cell will receive the parameter during a wakeup interval of the access terminal. As a result, such an access terminal may more readily discover the femto cell on the other carrier frequency.

Accordingly, the disclosure relates in some aspects to a scheme for transmitting a cell reselection parameter. Here, a first access point (e.g., a femto cell) receives a first cell reselection parameter (e.g., Sintersearch) that is broadcast by a second access point (e.g., a macro cell). In addition, the first access point receives access terminal wakeup information (e.g., DRX cycle information) associated with the second access point. The first access point then generates a substitute cell reselection parameter and transmits this parameter on the carrier frequency used by the second access point for a period of time that is based on the access terminal wakeup information.

BRIEF DESCRIPTION OF THE DRAWINGS

These and other sample aspects of the disclosure will be described in the detailed description and the appended claims that follow, and in the accompanying drawings, wherein:

Figure 1:
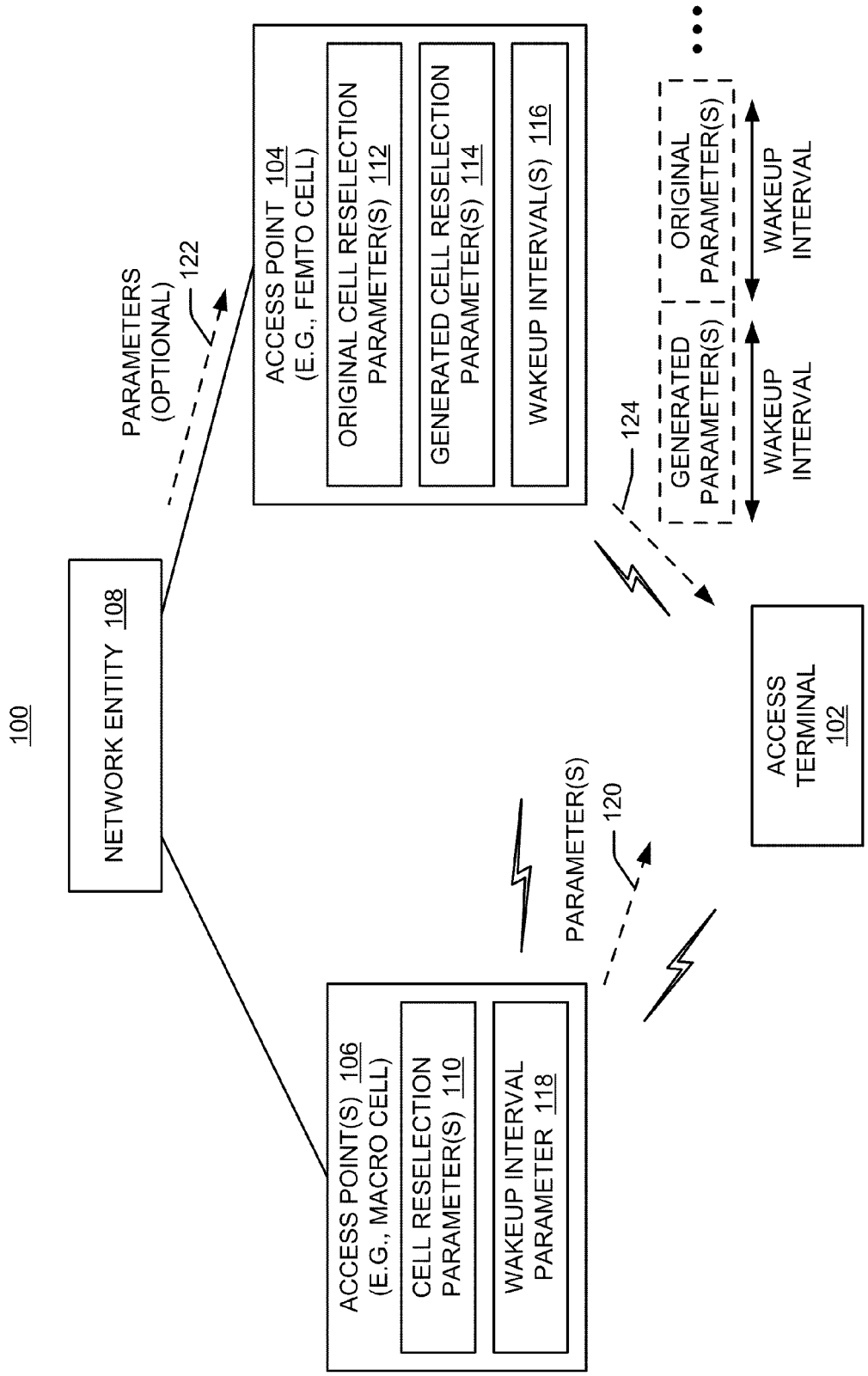
FIG. 1 is a simplified block diagram of several sample aspects of a communication system where an access point transmits a substitute cell reselection parameter.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, femto cells, and so on, while access terminals may be referred to or implemented as user equipment, mobile stations, and so on.

Access points in the system 100 provide access to one or more services (e.g., network connectivity) for one or more wireless terminals (e.g., access terminal 102) that may be installed within or that may roam throughout a coverage area of the system 100. For example, at various points in time the access terminal 102 may connect to an access point 104, or other access points in the system 100 (represented by access point 106). Each of these access points may communicate with one or more network entities (represented, for convenience, by network entity 108) to facilitate wide area network connectivity.

These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals. Also, two of more of these network entities may be co-located and/or two or more of these network entities may be distributed throughout a network.

Access points in the system 100 may utilize certain cell reselection parameters (e.g., Sintersearch, Qqualmin, and Qrxlevmin) to control various aspects of how access terminals are handed-over from one cell to another cell (e.g., from one access point to another). For example, an access point may transmit a broadcast channel including cell reselection parameters, whereby any access terminals being served by that access point will receive these parameters. Each of these access terminals may then use one or more of these parameters to control how the access terminal conducts inter-frequency searches for other access points.

As shown in FIG. 1, the access point 106 (e.g., a macro access point) maintains one or more cell reselection parameters 110. The access point 106 broadcasts the cell reselection parameter(s) and other parameters on a carrier frequency as indicated by the dashed line 120. Other access points in the system 100 will broadcast similar cell parameters (on the same or different carrier frequencies). Accordingly, access terminals (e.g., access terminal 102) in the system 100 may receive these parameters and use them for various mobility operations (e.g., controlling inter-frequency searches).

The access point 104 may operate on a carrier frequency (a first frequency) that is different from the carrier frequency (a second frequency) used by a macro cell (e.g., corresponding to access point 106) within the coverage of which the access point 104 is deployed. As discussed herein, the access point 104 acquires the cell reselection parameter(s) broadcast by the access point 106 on the second frequency. The access point 104 maintains a copy of the original reselection parameter(s) 112 and also generates a substitute reselection parameter 114 corresponding to each original reselection parameter 114. In particular, the access point 104 modifies (e.g., increases or decreases) each substitute reselection parameter in a way that will cause an access terminal that receives the parameter to conduct inter-frequency searches in a more aggressive manner. In this way, the access point 104 increases the likelihood that any access terminals operating on the macro carrier frequency that are close to the access point 104 will conduct an inter-frequency search, and thereby discover the access point 104 operating on its carrier frequency.

The access point 104 transmits the substitute reselection parameter(s) on the second carrier frequency for a period of time that is longer than the wakeup interval used by the access terminals being served by the access point 106 as represented by the dashed line 124 and corresponding dashed box in FIG. 1. In this way, the access point may ensure that any nearby access terminals operating on the second carrier frequency will receive the substitute reselection parameter(s).

In addition, after transmitting the substitute reselection parameter(s), the access point 104 transmits the original reselection parameter(s) on the second carrier frequency for a period of time that is longer than the wakeup interval as represented by the dashed line 124 and corresponding dashed box in FIG. 1. In this way, the access point 104 prevents access terminals that received the substitute reselection parameter(s) (but did not reselect to the access point 104) from performing excessive inter-frequency searches while they are in the vicinity of the access point 104.

In a sample implementation, a femto cell transmits a "cloned" version of a macro cell broadcast channel (BCH) on the macro frequencies. The "cloned" version of the BCH is referred to as the "clone" BCH in the discussion of the sample implementation that follows. An Sintersearch parameter (and/or some other cell reselection parameter) governing the access terminal's inter-frequency search is modified on the "clone" BCH to force inter-frequency searches by an access terminal on the macro carrier frequency. As discussed herein, the "clone" BCH also includes other channels such as CPICH and PCH to facilitate the implementation of this scheme. For example, the femto cell may send a Paging Type 1 message to force an access terminal in the vicinity of the femto cell to read the modified BCCH parameter. In one exemplary case, the femto cell transmits a beacon that includes a common pilot channel (CPICH), a broadcast channel (BCH/BCCH), and a paging channel (PCH).

Upon reading the new Sintersearch parameter, the access terminal performs an inter-frequency search and discovers the femto cell. In a multiple macro carrier scenario, the "clone" BCH is transmitted on each macro carrier. BCH cloning also may be applied cyclically to multiple macro cells. BCH cloning also is applicable to handover regions where multiple macro cells can be detected.

To ensure good discovery performance for the "clone" BCH scheme and minimal impact on macro access terminal battery life, the "clone" BCH is transmitted long enough to cover all the wakeup times of the access terminals. For example, for a DRX cycle of 1.28 seconds, the transmission duration of the "clone" BCH with the new Sintersearch parameter is at least 1.28 seconds. This will ensure that the "clone" BCH is seen by an access terminal in the vicinity of the femto cell irrespective of the wakeup time of the access terminal. In addition, to avoid unnecessary interference to nearby access terminals on the macro cell, the transmission duration of the "clone" BCH is restricted to be not much longer than the DRX cycle.

Sample operations that may be employed to provide substitute cell reselection parameters will now be described in more detail in conjunction with the flowcharts of FIGS. 2 and 3. For convenience, the operations of FIGS. 2 and 3 (or any other operations discussed or taught herein) may be described as being performed by specific components (e.g., the components of FIG. 1 or FIG. 4). It should be appreciated, however, that these operations may be performed by other types of components and may be performed using a different number of components. It also should be appreciated that one or more of the operations described herein may not be employed in a given implementation.

Figure 2:
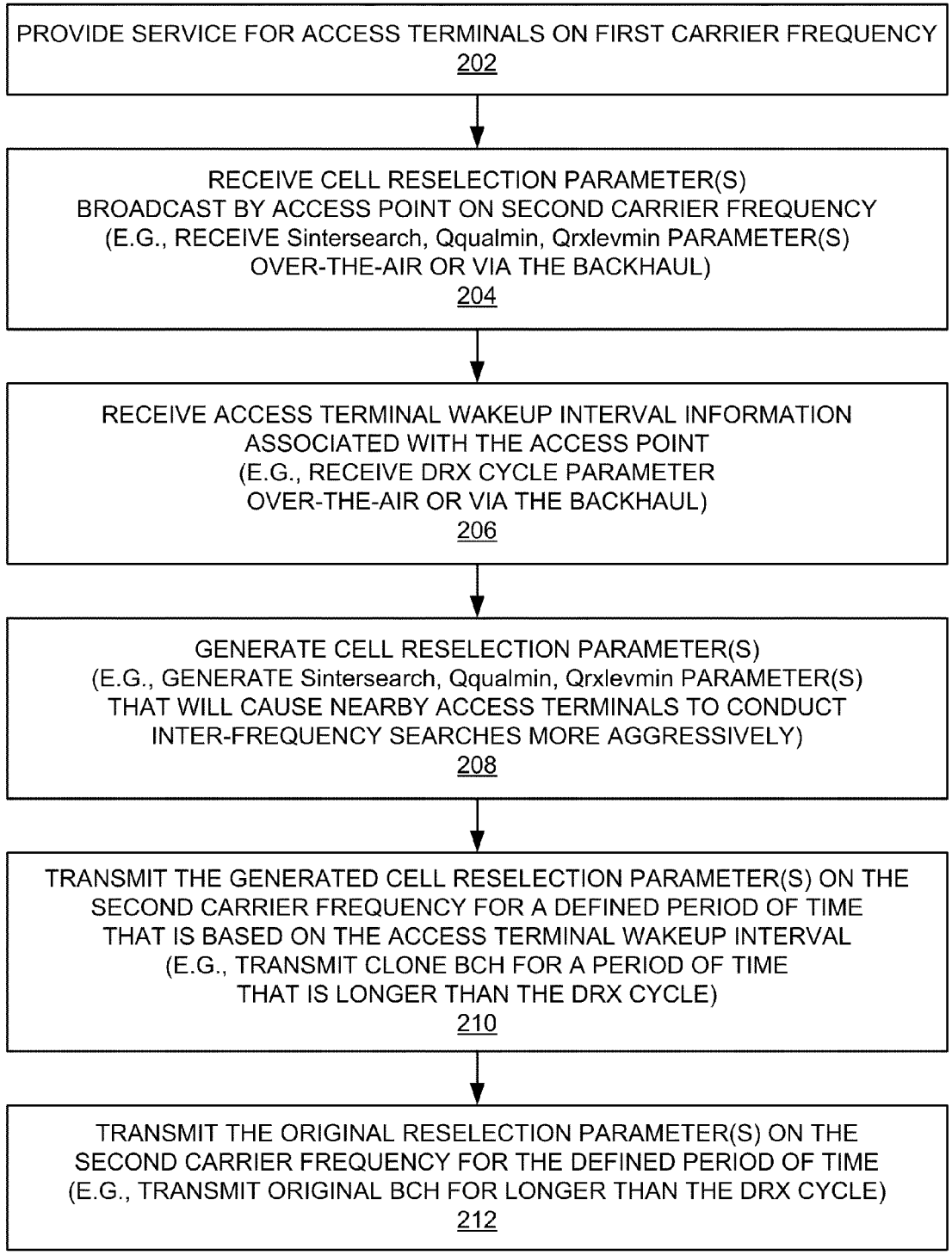
FIG. 2 is a flowchart of several sample aspects of operations that may be performed to transmit a substitute cell reselection parameter.

FIG. 2 describes sample operations that may be performed at a first access point to transmit a substitute cell reselection parameter on a carrier frequency used by a macro cell (provided by a second access point). Examples of how an access point may transmit multiple substitute cell reselection parameters for multiple macro cells are described at FIG. 3. For purposes of illustration, the first access point may be referred to as a femto cell and the second access point may be referred to as a macro cell in the discussion that follows. It should be appreciated, however, that the described operations may be implemented at other types of entities.

Referring initially to FIG. 2, as represented by block 202, a femto cell provides service for access terminals on a first carrier frequency. For example, the femto cell may provide full service to a small set of authorized access terminals (e.g., access terminals authorized by the owner of the femto cell) and may provide limited service to other access terminals. These access terminals employ cell reselection procedures (including inter-frequency searches) to discover and connect to target access points as discussed herein. For example, a user of an authorized access terminal may initially be served by a macro cell that has a coverage area that encompasses the coverage area of the femto cell. This macro cell operates on a second carrier frequency. As the user approaches the femto cell, the access terminal may discover the femto cell as a result of an inter-frequency search. Upon discovering the femto cell, the authorized access terminal may switch to the first carrier frequency to connect to the femto cell. An unauthorized access terminal also may discover the femto cell in a similar manner. However, the unauthorized access terminal may not attempt to connect to the femto cell since that terminal may know that it cannot obtain service there, or any attempt to make such a connection by the unauthorized access terminal may be rejected by the femto cell.

As represented by block 204, the femto cell receives one or more cell reselection parameters that are broadcast by the macro cell on the second carrier frequency. The femto cell may receive such a parameter in various ways. As one example, the femto cell receives the parameter over-the-air when the macro cell broadcasts the parameter via its broadcast channel. As another example, the femto cell may receive the parameter via the core network (as represented by the network entity 108 in FIG. 1). For example, the parameter may be sent from another access point (e.g., access point 106) or some other network entity that maintains the parameter, and provided via the network backhaul to the femto cell (e.g., as represented by the arrow 122 of FIG. 1).

Different types of cell reselection parameters may be employed in different implementations. For example, parameters such as Sintersearch, Qqualmin, or Qrxlevmin may be employed to control inter-frequency searches in various cases. In some cases, one of these parameters may be employed (e.g., received at block 204). In other cases, two or more of these parameters may be employed (e.g., received at block 204).

Sintersearch is a parameter that is typically employed to directly control inter-frequency search operations. Here, a higher value Sintersearch may cause an access terminal to conduct inter-frequency searches more aggressively, while a lower value Sintersearch may cause an access terminal to conduct inter-frequency searches less aggressively.

In some aspects, Qqualmin may correspond to a minimum required signal quality at a cell (e.g., the current cell or a target cell). A higher Qqualmin value for a current cell (or a lower value for a target cell) may cause an access terminal to conduct inter-frequency searches more aggressively. Conversely, a lower Qqualmin value for a current cell (or a higher value for a target cell) may cause an access terminal to conduct inter-frequency searches less aggressively.

In some aspects, Qrxlevmin may correspond to minimum received signal level for a cell (e.g., a measure of a cell's quality based on received pilot level (received signal code power)). Again, this parameter may correspond to the current cell or a target cell. A higher Qrxlevmin value for a current cell (or a lower value for a target cell) may cause an access terminal to conduct inter-frequency searches more aggressively. Conversely, a lower Qrxlevmin value for a current cell (or a higher value for a target cell) may cause an access terminal to conduct inter-frequency searches less aggressively.

As represented by block 206, the femto cell also receives access terminal wakeup interval information associated with the macro cell. One or more wakeup interval parameters may be defined for access terminals in a network. In some aspects, a wakeup interval specifies a maximum amount of time that an access terminal is allowed to stay in a low power mode (i.e., a sleep state). That is, an access terminal is guaranteed to be awake and listening for signals at least one during the wakeup interval. Note, however, that the access terminal may not necessarily wakeup at periodic intervals. One example of a wakeup interval parameter is a discontinuous reception (DRX) cycle parameter.

Wakeup interval parameters may be defined on a system-wide basis, on a per access point basis, on a per-cell basis, or in some other manner. FIG. 1 illustrates that the access point 106 may maintain a wakeup interval parameter 118 that specifies the wakeup interval that is to be used by access terminals operating within a given cell of the access point 106. Here, the access point 106 may broadcast the wakeup interval parameter along with, for example, other parameters as indicated by the dashed arrow 120. Again, other access points in the system 100 may maintain and broadcast similar parameters.

A femto cell may acquire wakeup interval information in various ways. For example, the macro cell may broadcast the access terminal wakeup interval information and other parameters via, for example, a message including a system information block (SIB) or some other suitable type of message as indicated by the dashed arrow 120 in FIG. 1. The femto cell may therefore use a network listen module (NLM) or some other suitable component to read the SIB information of the nearby macro cell to determine the wakeup interval (e.g., the DRX cycle) used by the macro cell. The femto cell may then maintain a copy of the wakeup interval information 116 as shown in FIG. 1. FIG. 1 also illustrates that the access point 104 may acquire wakeup interval parameters via the core network (as represented by the network entity 108). For example, these parameters may be sent via the network backhaul as represented by the dashed line 122 from another access point (e.g., parameter 118 from access point 106) or some other network entity that maintains the parameters.

As represented by block 208, the femto cell generates one or more cell reselection parameters corresponding to the cell reselection parameters received at block 204. As discussed herein, the values of the original parameters are replaced with values that will cause an access terminal to conduct inter-frequency searches more aggressively. For example, an Sintersearch parameter may be increased, a Qqualmin parameter corresponding to the serving macro cell may be increased, a Qqualmin parameter corresponding to target cells may be decreased, a Qrxlevmin parameter corresponding to the serving macro cell may be increased, a Qrxlevmin parameter corresponding to target cells may be decreased.

As represented by block 210, the femto cell transmits the generated cell reselection parameter(s) on the second carrier frequency for a defined period of time that is based on the wakeup interval received at block 206. For example, as mentioned above, the femto cell may broadcast a message (e.g., a Paging Type 1 Message) on the second carrier frequency that causes access terminals that receive the message to read the BCH. The femto cell may then broadcast a "cloned" BCH including the generated cell reselection parameter(s) for a period of time that is longer than the DRX cycle employed at the macro cell. Consequently, any access terminals that receive the "cloned" BCH will use the substitute cell reselection parameters and therefore conduct an inter-frequency search. As a result, the access terminals will more readily discover the femto cell.

The defined period of time employed at block 210 may be defined in various ways. In some cases, the defined period of time may be equal to the wakeup interval (e.g., the DRX cycle). In some cases, the defined period of time may be longer than the wakeup interval (e.g., between 100% and 105% of the DRX cycle). As mentioned above, the duration of the defined period of time may be limited to not significantly exceed the wakeup interval to reduce the amount of interference potentially caused by the "clone" BCH on the macro carrier frequency.

The frequency with which the transmission of block 210 occurs (e.g., the transmission of the "clone" BCH) depends, in some aspects, on the types of tradeoffs to be made between how quickly a femto cell on another carrier frequency may be discovered and the amount of interference that is acceptable on the macro carrier frequency. If quicker discovery is desired, this transmission may be configured to occur more frequently. If less interference is desired, this transmission may be configured to occur less frequently. As one example, a "clone" BCH may be sent every two minutes in an attempt to ensure that an access terminal is able to discover the femto cell within that period of time.

In the event an access terminal served by the macro cell (e.g., an access terminal that is not authorized at the femto cell) passes by the femto cell when the "clone" BCH is being transmitted, this access terminal may detect the "clone" BCH and read the new settings (e.g., Sintersearch). In practice, these settings may stay with the access terminal for a relatively long period of time (e.g., up to 6 hours) until the access terminal reads the macro BCH again or reselects to another cell. Consequently, a macro access terminal (e.g., in a neighboring apartment) may end up performing inter-frequency searches constantly if it happens to fall into the "capture area" of a "clone" BCH of a neighbor's femto cell. These unnecessary searches may result in degradation in the standby time of the access terminal. To address this issue, the femto cell may transmit the "clone" BCH again, but this time with parameter values (e.g., Sintersearch) used by the macro cell.

Accordingly, as represented by block 212, the transmission of the generated cell reselection parameter(s) at block 210 triggers the femto cell to transmit the original cell reselection parameter(s) on the second carrier frequency for a period of time that is based on the wakeup interval received at block 206. For example, at some point in time after transmitting the "clone" BCH with the substitute parameter(s), the femto cell broadcasts a message (e.g., a Paging Type 1 Message) on the second carrier frequency that causes access terminals that receive the message to again read the BCH. The femto cell then transmits a BCH that includes the original parameter(s) on the second carrier frequency. Here, the transmission of an original parameter (e.g., which may be proceeded by the transmission of a paging message) may occur immediately after the prior transmission of a generated parameter, or some time after the prior transmission (e.g., there may be a gap between transmissions).

The "clone" BCH of block 212 is also transmitted for a long enough period of time so that it covers all the access terminal wakeup times (e.g., at least 1.28 seconds for a DRX cycle of 1.28 seconds). This will enable the neighbor macro access terminal to set its search parameters back to the default values to thereby avoid more unnecessary searches. For example, consider the case where the "clone" BCH with a new Sintersearch value is transmitted for 1.28 seconds every 5 minutes. If a neighbor macro access terminal happens to be in the "capture area" of the "clone" BCH, that access terminal will detect the new search parameters and will perform unnecessary searches for a period of time even if the neighbor macro access terminal moves out of the "capture region". However, if the "clone" BCH is repeated for another 1.28 seconds but this time with the old Sintersearch value, the neighbor macro access terminal will reset the Sintersearch value and, hence, will stop searching until the next time it receives the "clone" BCH with the substitute parameter(s).

Figure 3:
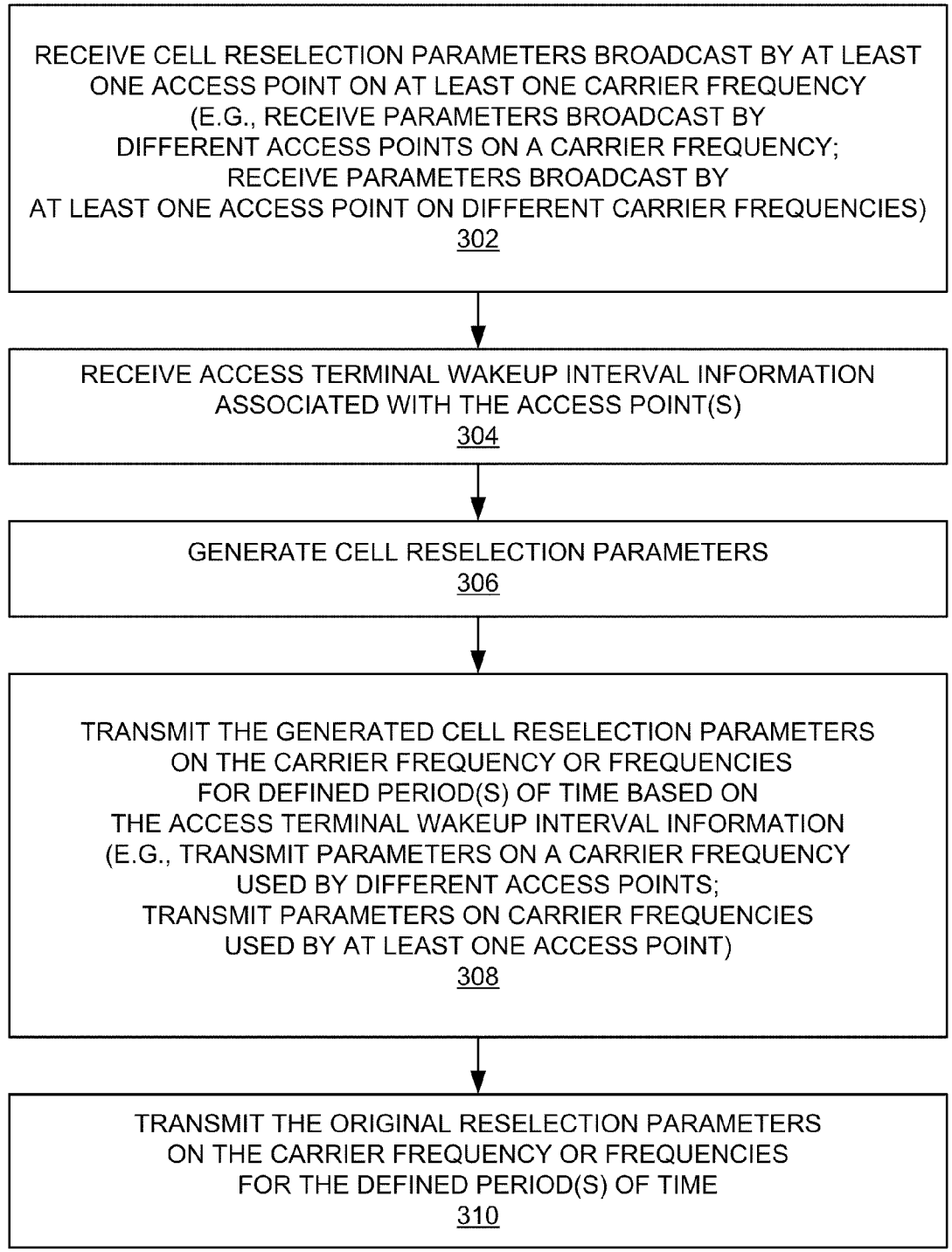
FIG. 3 is a flowchart of several sample aspects of operations that may be performed to transmit multiple substitute cell reselection parameters.

Referring now to FIG. 3, as mentioned above, the teachings herein are applicable to various cases where a femto cell transmits multiple substitute cell reselection parameters (e.g., via multiple "clone" BCHs). For example, in a multiple carrier scenario, substitute cell reselection parameters are transmitted on different carriers. In addition, in a scenario where a femto cell is able to detect signals from multiple macro cells, substitute cell reselection parameters are transmitted in a time-division multiplexed manner for each macro cell.

As represented by block 302, the femto cell receives cell reselection parameters that are broadcast by one or more macro cells on one or more carrier frequencies. For the multiple carrier scenario, the femto cell receives parameters that are broadcast by a single macro cell on multiple carriers, or by multiple macro cells on one or more carriers. Here, the femto cell may obtain these parameters in a similar manner as described above at block 204. For example, in a case where the femto cell receives the parameters over-the-air, the femto cell may tune its receiver (or one of its receivers) to these different frequencies to receive the parameters (e.g., via one or more BCHs transmitted on each channel). For the multiple macro cell scenario, the femto cell receives parameters that are broadcast by different macro cells (on the same carrier frequency or different carrier frequencies). Here, different macro cells may use different coding (e.g., different code offsets) to transmit their respective signals. Also, different macro cells may use the same parameters or different parameters. For cases where the same parameters are used, different macro cells may use the same parameter values or different parameter values.

As represented by block 304, the femto cell may receive access terminal wakeup interval information associated with each macro cell and/or carrier frequency. In some cases, the same wakeup interval (e.g., DRX cycle=1.28 seconds) may be employed for each of these macro cells and/or carrier frequencies. In other cases, different wakeup intervals may be employed for different macro cells and/or different carrier frequencies. Again, the femto cell may obtain the parameter(s) for a given access point and/or carrier frequency in a similar manner as described above at block 206 (e.g., information is received for each access point, or a single network-wide value is received from the network).

As represented by block 306, the femto cell generates substitute cell reselection parameters corresponding to the cell reselection parameters received at block 302. As discussed at block 208, the values of the original parameters are replaced with values that will cause an access terminal to conduct inter-frequency searches more aggressively. For a multiple carrier scenario, the same or different parameters may be generated for different carrier frequencies depending on the design goals for the system. For a multiple macro cell scenario, the same or different parameters may be generated for different macro cells depending on the design goals for the system.

As represented by block 308, the femto cell transmits each of the generated cell reselection parameters on the designated carrier frequency or frequencies for a defined period of time or different periods of time. As discussed herein, the defined period(s) of time may be based on the wakeup interval information received at block 304. Here, as discussed above at block 210, the femto cell may broadcast a message (e.g., a Paging Type 1 Message) for each macro cell and/or each carrier frequency to cause access terminals that receive the message on that frequency (or those frequencies) to look for a BCH transmission. The femto cell may then broadcast the "clone" BCH for each macro cell and/or carrier frequency for the appropriate period of time. Consequently, any access terminals that receive the "clone" BCHs will use the substitute cell reselection parameters and therefore conduct an inter-frequency search. For example, for a scenario where multiple macro cells transmit on the same carrier frequency, the femto cell may transmit different "clone" BCHs for the different macro cells in succession (e.g., in a time-division multiplexed manner). For a multiple carrier scenario, the femto cell may transmit the "clone" BCHs for each carrier frequency in succession. Here, it should be appreciated that more than one "clone" BCH may be transmitted on a given carrier frequency (in a case where signals from multiple macro cells are detected at the femto cell on that carrier frequency). Also, a subsequent transmission may occur immediately after the prior transmission, or some time after the prior transmission (e.g., there may be a gap between transmissions).

In the case of multiple macro frequencies, the "clone" BCH is transmitted long enough on each frequency to ensure that the access terminals on that frequency are able to receive the "clone" BCH irrespective of the wakeup times of these access terminals. For example, for a DRX cycle of 1.28 seconds, the transmission duration of the "clone" BCH with a new Sintersearch parameter and/or other parameter may be at least 1.28 seconds. As above, to avoid unnecessary interference to nearby macro access terminals, the transmission duration of the "clone" BCH on each frequency may be limited to be not much larger than the wakeup interval (e.g., the DRX cycle).

Similarly in handover regions where multiple macro cells are detectable at the femto cell, a "clone" BCH is transmitted long enough for each macro cell to ensure that the access terminals on that frequency are able to receive the "clone" BCH irrespective of the wakeup times of these access terminals. For example, for a DRX cycle of 1.28 seconds, the transmission duration of the "clone" BCH with a new Sintersearch parameter and/or other parameter may be at least 1.28 seconds. To avoid unnecessary interference to nearby macro access terminals, the transmission duration of the "clone" BCH for each macro cell may be limited to be not much larger than the wakeup interval (e.g., the DRX cycle).

As represented by block 310, the transmission of the generated cell reselection parameter(s) at block 308 triggers the femto cell to transmit the original cell reselection parameters for the designated macro cells and/or carrier frequencies for a period of time that is based on the wakeup interval information received at block 304. As above, these transmissions may be performed in succession on the various carrier frequencies and/or for the various macro cells. Also, the transmission of an original parameter may occur immediately after the prior transmission of a generated parameter, or some time after the prior transmission (e.g., there may be a gap between transmissions).

Various considerations may be taken into account in an implementation that incorporates the teachings herein. For example, the timing of the transmitted "clone" BCH should preferably be set to within a few chips of the macro cell so that "cloned" BCH arrival at the access terminal is within the search window of the access terminal. Note that this consideration applies individually to all macro cells in a multiple macro cell scenario and all carrier frequencies in a multiple carrier scenario. Thus, the femto cell should track the timing of each macro cell to be cloned on each corresponding carrier frequency.

Also, the femto cell should preferably transmit the CPICH on the macro carrier frequency for channel estimation purposes. Otherwise there may be a mismatch between the channel estimation based on the macro CPICH and the channel experienced by the "cloned" BCH from the femto cell.

In addition, various conditions may be met at the femto cell and the access terminal to ensure that the access terminal can detect the cloned BCCH signal, and to ensure that the access terminal cannot distinguish between the original BCCH signal and the "cloned" BCCH signal. For example, in a case wherein the "clone" BCH and the macro cell BCH are phase aligned, it may be preferable to ensure that the "clone" BCH is approximately 4-5 dB stronger that the macro cell BCH in the capture area of the femto cell. Conversely, in a case wherein the "clone" BCH and the macro cell BCH are not phase aligned, it may be preferable to ensure that the "clone" BCH is approximately 9 dB stronger that the macro cell BCH in the capture area of the femto cell.

Also, a minimum distance requirement may need to be enforced between the femto cell and any macro cells being cloned. For example, a minimum distance on the order of 200 meters may be specified in a case whether the PCCPCH transmit power of the "clone" BCH is 10 dBm, the SCCPCH transmit power of the "clone" BCH is 10 dBm, the CPICH transmit power of the "clone" BCH is 15 dBm, the PCCPCH transmit power of the macro cell is 43−15=28 dBm, and the capture area is 80 dB.

Figure 4:
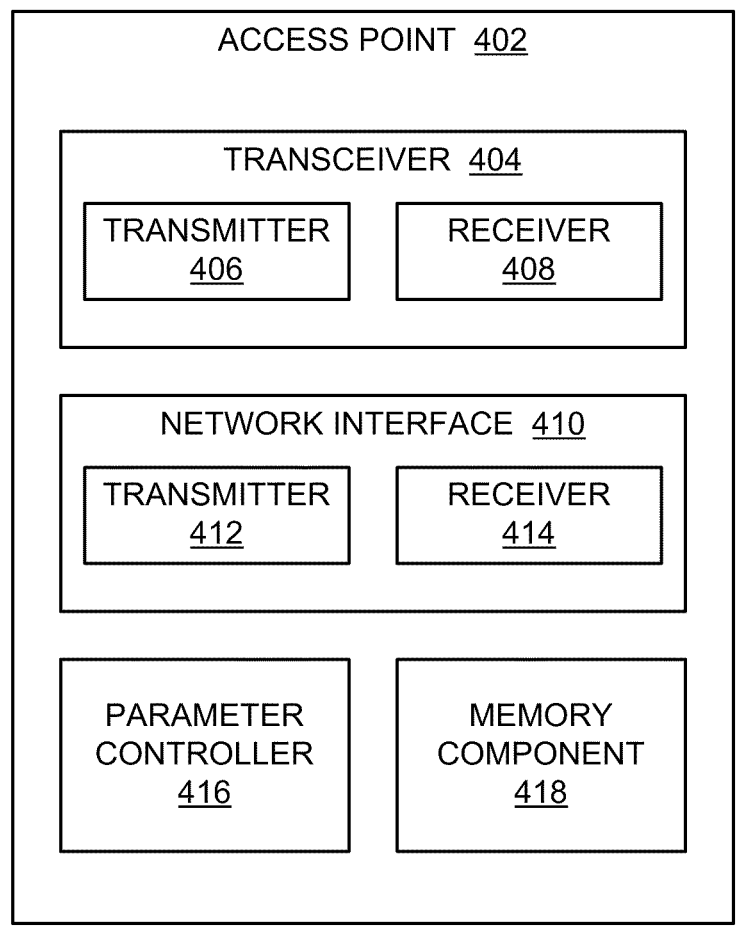
FIG. 4 is a simplified block diagram of several sample aspects of components that may be employed in communication nodes.

FIG. 4 illustrates several sample components that may be incorporated into nodes such as an access point 402 (e.g., corresponding to access point 104) to perform cell reselection parameter operations as taught herein. The described components also may be incorporated into other nodes in a communication system. For example, other nodes in a system may include components similar to those described for the access point 402 to provide similar functionality. A given node may contain one or more of the described components. For example, an access point may contain multiple transceiver components that enable the access terminal to operate on multiple frequencies and/or communicate via different technologies.

As shown in FIG. 4, the access point 402 includes a transceiver 404 for communicating over-the-air with other nodes (e.g., access terminals, other access points). The transceiver 404 includes a transmitter 406 for sending signals (e.g., transmitting cell parameters and/or other parameters) and a receiver 408 for receiving signals (e.g., receiving cell parameters and/or other parameters).

The access point 402 also includes a network interface 410 for communicating with other nodes (e.g., network entities). For example, the network interface 410 may be configured to communicate with one or more network entities via a wire-based or wireless backhaul. In some aspects, the network interface 410 may be implemented as a transceiver (e.g., including transmitter and receiver components 412 and 414, respectively) configured to support wire-based or wireless communication (e.g., for sending and receiving cell parameters and/or other parameters).

The access point 402 also includes other components that may be used in conjunction with cell reselection parameter operations as taught herein. For example, the access point 402 may include a parameter controller 416 for acquiring and generating parameter information (e.g., receiving cell reselection parameters, receiving access terminal wakeup interval information, generating cell reselection parameters) and for providing other related functionality as taught herein. In addition, the access point 402 may include a memory component 418 (e.g., including a memory device) for maintaining information (e.g., cell parameters and/or other parameters).

In some implementations the components of FIG. 4 may be implemented in one or more processors (e.g., each of which uses and/or incorporates data memory for storing information or code used by the processor to provide this functionality). For example, some of the functionality of blocks 404 and 410 and some or all of the functionality of blocks 416 and 418 may be implemented by a processor or processors of an access point and data memory of the access point (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 5:
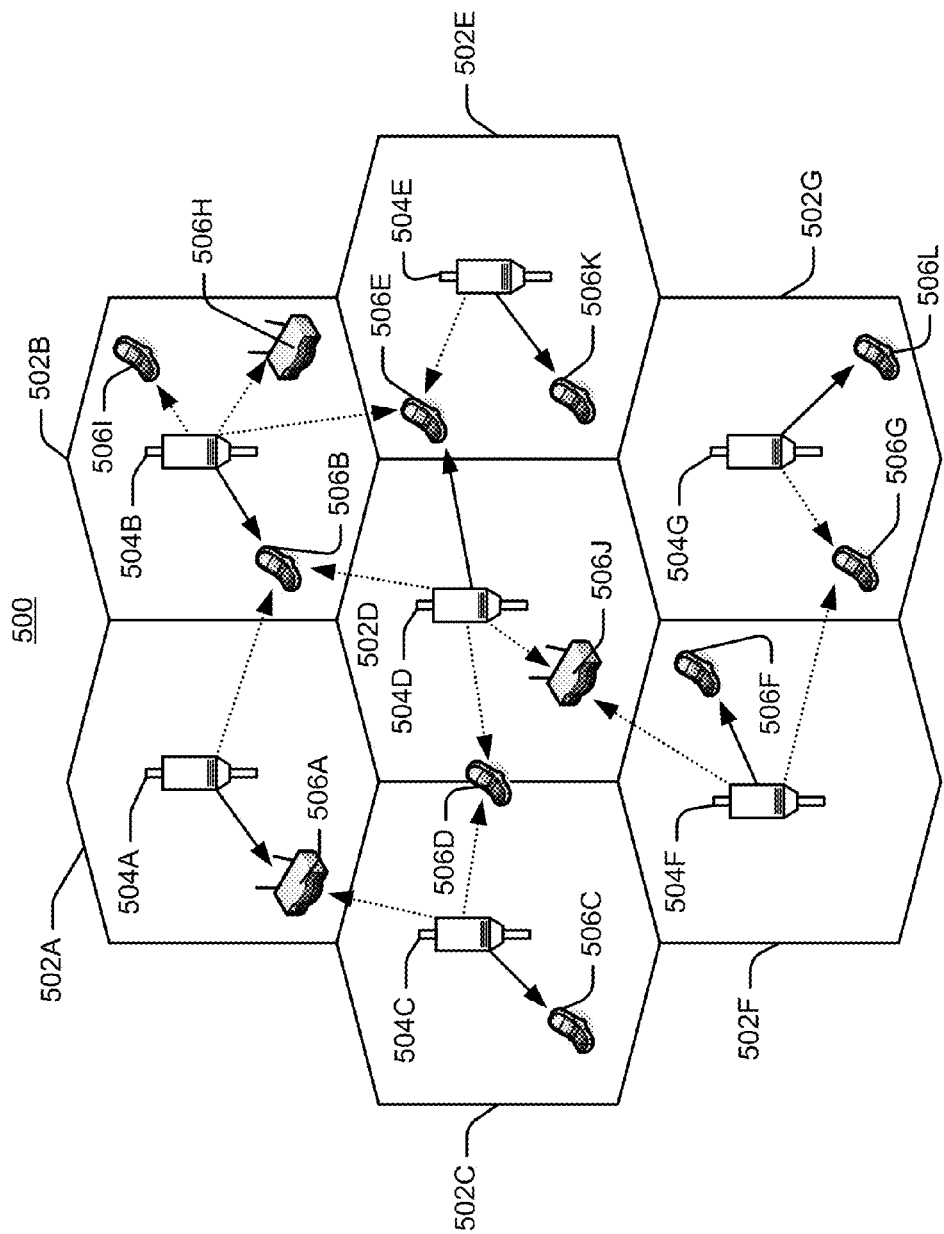
FIG. 5 is a simplified diagram of a wireless communication system.

FIG. 5 illustrates a wireless communication system 500, configured to support a number of users, in which the teachings herein may be implemented. The system 500 provides communication for multiple cells 502, such as, for example, macro cells 502A-502G, with each cell being serviced by a corresponding access point 504 (e.g., access points 504A-504G). As shown in FIG. 5, access terminals 506 (e.g., access terminals 506A-506L) may be dispersed at various locations throughout the system over time. Each access terminal 506 may communicate with one or more access points 504 on a forward link (FL) and/or a reverse link (RL) at a given moment, depending upon whether the access terminal 506 is active and whether it is in soft handoff, for example. The wireless communication system 500 may provide service over a large geographic region. For example, macro cells 502A-502G may cover a few blocks in a neighborhood or several miles in a rural environment.

Figure 6:
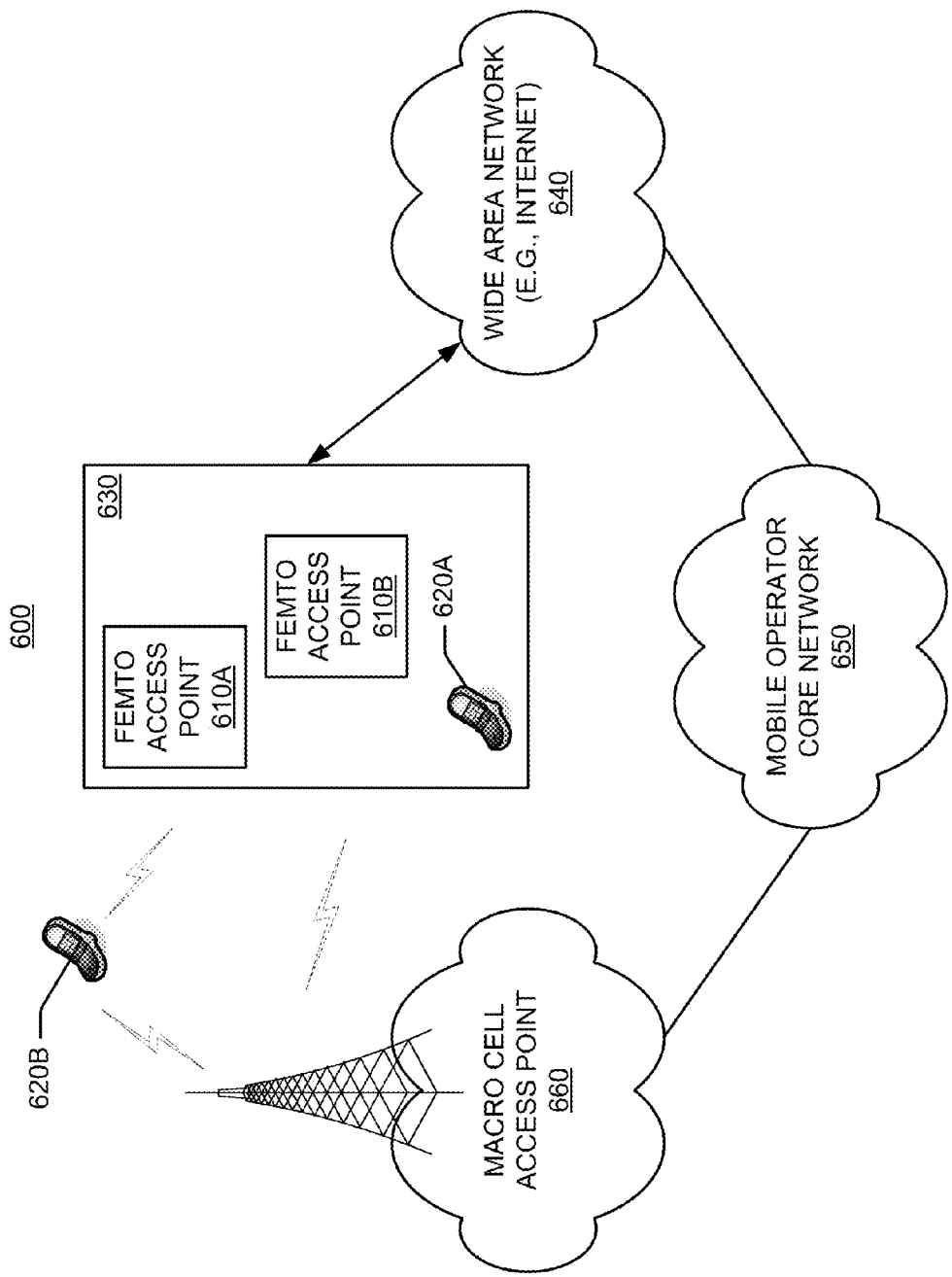
FIG. 6 is a simplified diagram of a wireless communication system including femto nodes.

FIG. 6 illustrates an exemplary communication system 600 where one or more femto access points are deployed within a network environment. Specifically, the system 600 includes multiple femto access points 610 (e.g., femto access points 610A and 610B) installed in a relatively small scale network environment (e.g., in one or more user residences 630). Each femto access point 610 may be coupled to a wide area network 640 (e.g., the Internet) and a mobile operator core network 650 via a DSL router, a cable modem, a wireless link, or other connectivity means (not shown). As will be discussed below, each femto access point 610 may be configured to serve associated access terminals 620 (e.g., access terminal 620A) and, optionally, other (e.g., hybrid or alien) access terminals 620 (e.g., access terminal 620B). In other words, access to femto access points 610 may be restricted whereby a given access terminal 620 may be served by a set of designated (e.g., home) femto access point(s) 610 but may not be served by any non-designated femto access points 610 (e.g., a neighbor's femto access point 610).

Figure 7:
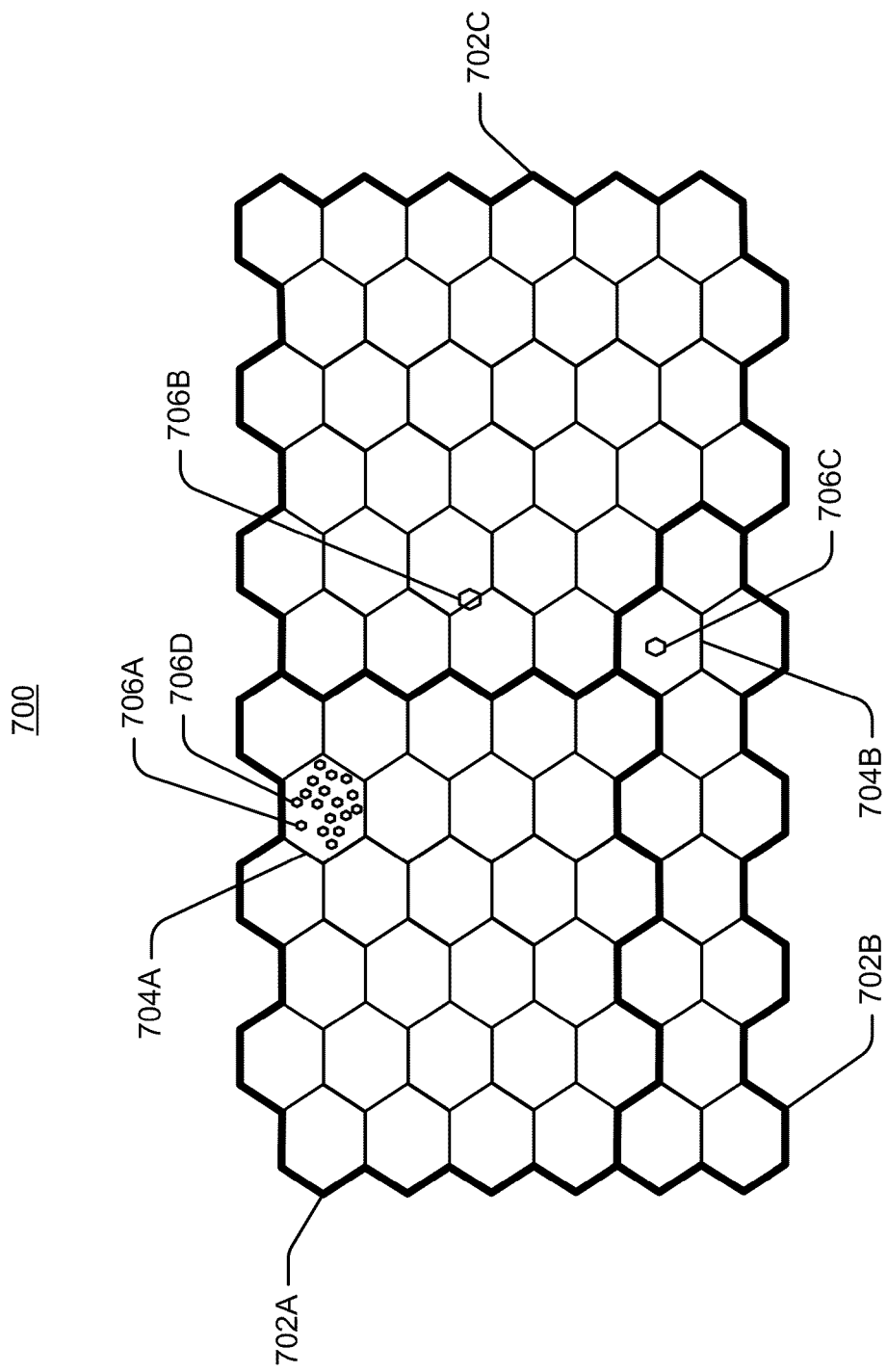
FIG. 7 is a simplified diagram illustrating coverage areas for wireless communication.

FIG. 7 illustrates an example of a coverage map 700 where several tracking areas 702 (or routing areas or location areas) are defined, each of which includes several macro coverage areas 704. Here, areas of coverage associated with tracking areas 702A, 702B, and 702C are delineated by the wide lines and the macro coverage areas 704 are represented by the larger hexagons. The tracking areas 702 also include femto coverage areas 706. In this example, each of the femto coverage areas 706 (e.g., femto coverage areas 706B and 706C) is depicted within one or more macro coverage areas 704 (e.g., macro coverage areas 704A and 704B). It should be appreciated, however, that some or all of a femto coverage area 706 may not lie within a macro coverage area 704. In practice, a large number of femto coverage areas 706 (e.g., femto coverage areas 706A and 706D) may be defined within a given tracking area 702 or macro coverage area 704. Also, one or more pico coverage areas (not shown) may be defined within a given tracking area 702 or macro coverage area 704.

Referring again to FIG. 6, the owner of a femto access point 610 may subscribe to mobile service, such as, for example, 3G mobile service, offered through the mobile operator core network 650. In addition, an access terminal 620 may be capable of operating both in macro environments and in smaller scale (e.g., residential) network environments. In other words, depending on the current location of the access terminal 620, the access terminal 620 may be served by a macro cell access point 660 associated with the mobile operator core network 650 or by any one of a set of femto access points 610 (e.g., the femto access points 610A and 610B that reside within a corresponding user residence 630). For example, when a subscriber is outside his home, he is served by a standard macro access point (e.g., access point 660) and when the subscriber is at home, he is served by a femto access point (e.g., access point 610A). Here, a femto access point 610 may be backward compatible with legacy access terminals 620.

A femto access point 610 may be deployed on a single frequency or, in the alternative, on multiple frequencies. Depending on the particular configuration, the single frequency or one or more of the multiple frequencies may overlap with one or more frequencies used by a macro access point (e.g., access point 660).

In some aspects, an access terminal 620 may be configured to connect to a preferred femto access point (e.g., the home femto access point of the access terminal 620) whenever such connectivity is possible. For example, whenever the access terminal 620A is within the user's residence 630, it may be desired that the access terminal 620A communicate only with the home femto access point 610A or 610B.

In some aspects, if the access terminal 620 operates within the macro cellular network 650 but is not residing on its most preferred network (e.g., as defined in a preferred roaming list), the access terminal 620 may continue to search for the most preferred network (e.g., the preferred femto access point 610) using a better system reselection (BSR) procedure, which may involve a periodic scanning of available systems to determine whether better systems are currently available and subsequently acquire such preferred systems. The access terminal 620 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 610, the access terminal 620 selects the femto access point 610 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 610 that reside within the corresponding user residence 630). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 8:
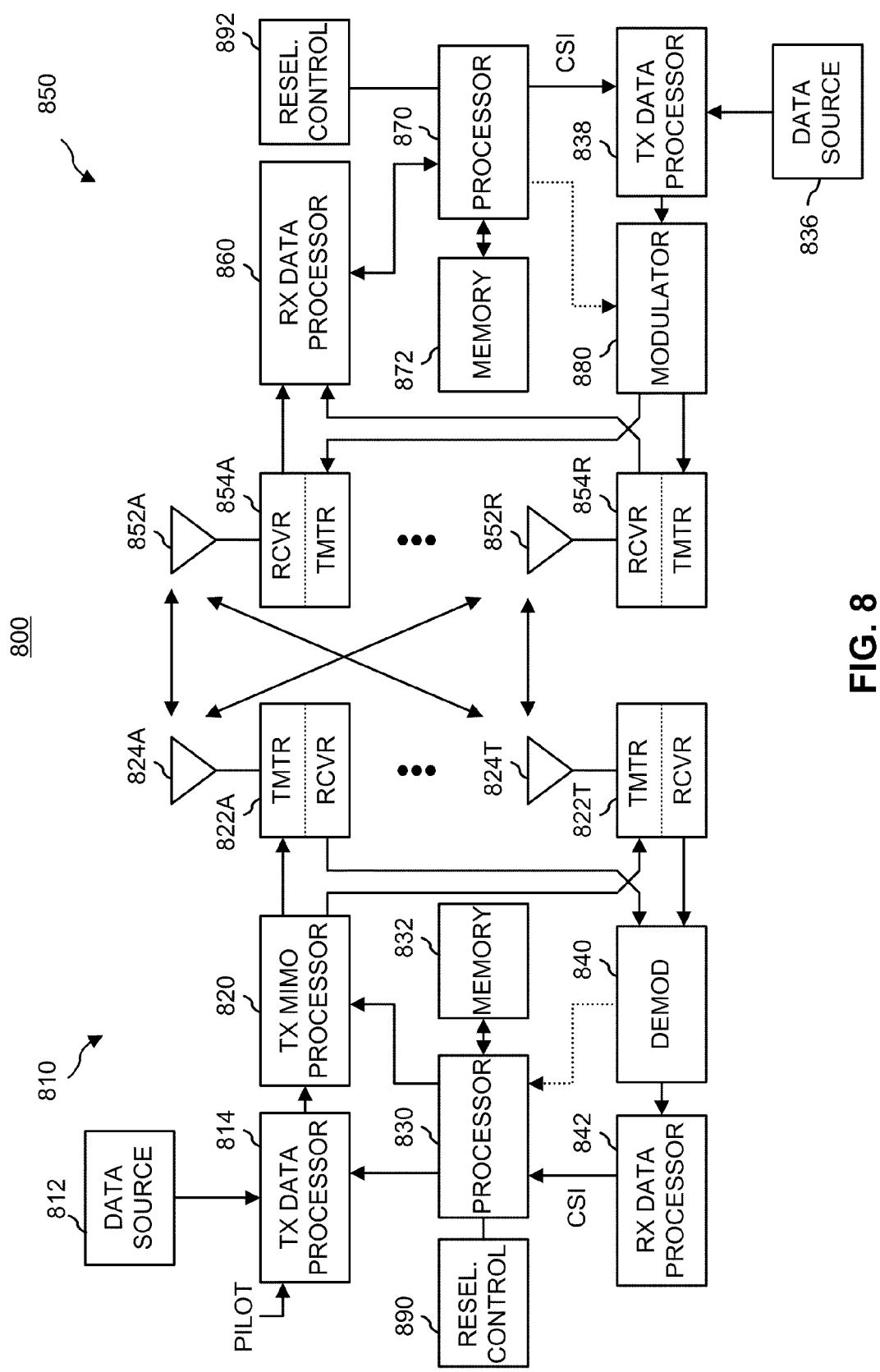
FIG. 8 is a simplified block diagram of several sample aspects of communication components.

FIG. 8 illustrates a wireless device 810 (e.g., an access point) and a wireless device 850 (e.g., an access terminal) of a sample MIMO system 800. At the device 810, traffic data for a number of data streams is provided from a data source 812 to a transmit (TX) data processor 814. Each data stream may then be transmitted over a respective transmit antenna.

The TX data processor 814 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 830. A data memory 832 may store program code, data, and other information used by the processor 830 or other components of the device 810.

The modulation symbols for all data streams are then provided to a TX MIMO processor 820, which may further process the modulation symbols (e.g., for OFDM). The TX MIMO processor 820 then provides $N_T$ modulation symbol streams to $N_T$ transceivers (XCVR) 822A through 822T. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822A through 822T are then transmitted from $N_T$ antennas 824A through 824T, respectively.

At the device 850, the transmitted modulated signals are received by $N_R$ antennas 852A through 852R and the received signal from each antenna 852 is provided to a respective transceiver (XCVR) 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive (RX) data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which pre-coding matrix to use (discussed below). The processor 870 formulates a reverse link message comprising a matrix index portion and a rank value portion. A data memory 872 may store program code, data, and other information used by the processor 870 or other components of the device 850.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by the transceivers 854A through 854R, and transmitted back to the device 810.

At the device 810, the modulated signals from the device 850 are received by the antennas 824, conditioned by the transceivers 822, demodulated by a demodulator (DEMOD) 840, and processed by a RX data processor 842 to extract the reverse link message transmitted by the device 850. The processor 830 then determines which pre-coding matrix to use for determining the beam-forming weights then processes the extracted message.

FIG. 8 also illustrates that the communication components may include one or more components that perform reselection (RESEL.) control operations as taught herein. For example, a reselection control component 890 may cooperate with the processor 830 and/or other components of the device 810 to facilitate reselection of another device (e.g., device 850) to the device 810 as taught herein. Similarly, a reselection control component 892 may cooperate with the processor 870 and/or other components of the device 850 to enable the device 850 to reselect to another device (e.g., device 810). It should be appreciated that for each device 810 and 850 the functionality of two or more of the described components may be provided by a single component. For example, a single processing component may provide the functionality of the reselection control component 890 and the processor 830 and a single processing component may provide the functionality of the reselection control component 892 and the processor 870.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 9:
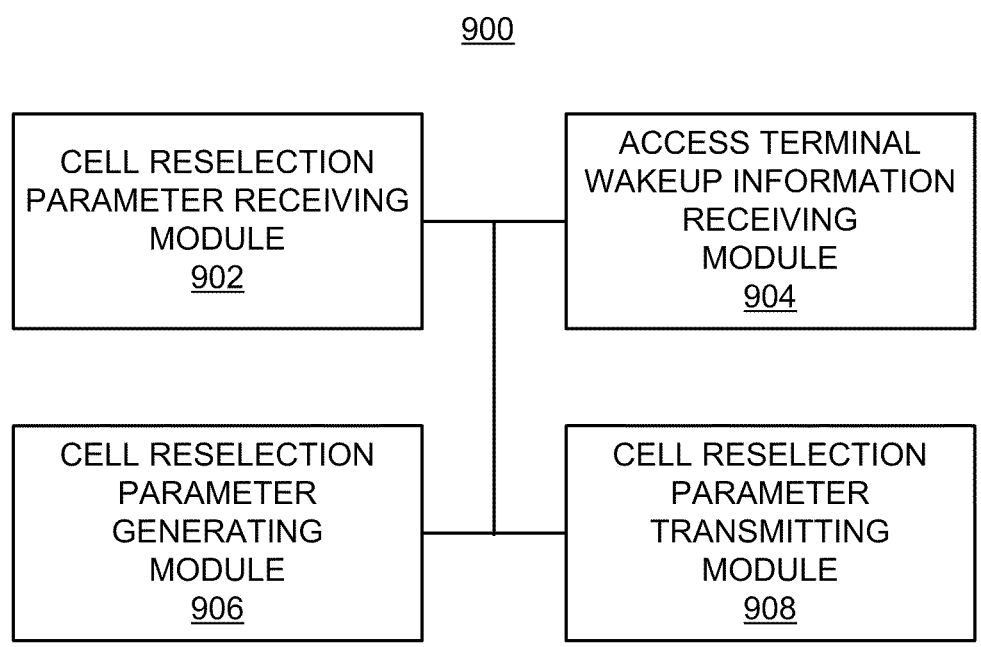
FIG. 9 is a simplified block diagram of several sample aspects of an apparatus configured to provide a substitute cell reselection parameter as taught herein.

The functionality described herein (e.g., with regard to one or more of the accompanying figures) may correspond in some aspects to similarly designated "means for" functionality in the appended claims. Referring to FIG. 9, an apparatus 900 is represented as a series of interrelated functional modules. Here, a cell reselection parameter receiving module 902 may correspond at least in some aspects to, for example, a parameter controller and/or a receiver as discussed herein. An access terminal wakeup information receiving module 904 may correspond at least in some aspects to, for example, a parameter controller and/or a receiver as discussed herein. A cell reselection parameter generating module 902 may correspond at least in some aspects to, for example, a parameter controller as discussed herein. A cell reselection parameter transmitting module 908 may correspond at least in some aspects to, for example, a parameter controller and/or a transmitter as discussed herein.

The functionality of the modules of FIG. 9 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIG. 9 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving a first broadcast channel, including a first cell reselection parameter at a first access point, wherein
      the first broadcast channel, including the first cell reselection parameter, is associated with, and broadcast by, a second access point on a carrier frequency, and
      the second access point provides access over an area larger than the first access point;
   receiving access terminal wakeup interval information at the first access point, wherein the access terminal wakeup interval information is associated with the second access point;
   generating a second cell reselection parameter that is different from the first cell reselection parameter; and
   transmitting, by the first access point, a second broadcast channel, which is a clone of the first broadcast channel, wherein the second broadcast channel includes the second cell reselection parameter in place of the first cell reselection parameter, on the carrier frequency for a defined period of time that is based on the access terminal wakeup interval information.

2. The method of claim 1, wherein the access terminal wakeup interval information specifies a discontinuous reception (DRX) cycle.

3. The method of claim 2, wherein the defined period of time is longer than the DRX cycle.

4. The method of claim 3, wherein the defined period of time is shorter than 105% of the DRX cycle.

5. The method of claim 1, wherein:
   the first cell reselection parameter comprises an Sintersearch parameter having a first value; and
   the second cell reselection parameter comprises an Sintersearch parameter having a second value that is higher than the first value.

6. The method of claim 1, wherein:
   the first cell reselection parameter comprises a Qqualmin parameter having a first value; and
   the second cell reselection parameter comprises a Qqualmin parameter having a second value that is different from the first value.

7. The method of claim 1, wherein:
   the first cell reselection parameter comprises a Qrxlevmin parameter having a first value; and
   the second cell reselection parameter comprises a Qrxlevmin parameter having a second value that is different from the first value.

8. The method of claim 1, further comprising:
   receiving at least one other first cell reselection parameter included in the first broadcast channel at the first access point, wherein the at least one other first cell reselection parameter is associated with, and broadcast by, the second access point on the carrier frequency;
   generating at least one other second cell reselection parameter that is different from the at least one other first cell reselection parameter; and
   transmitting, by the first access point, the second broadcast channel, which is a clone of the first broadcast channel, wherein the second broadcast channel includes the at least one other second cell reselection parameter in place of the at least one other first cell reselection parameter on the carrier frequency for the period of time that is based on the access terminal wakeup interval information.

9. The method of claim 8, wherein the first cell reselection parameter and the at least one other first cell reselection parameter collectively comprise at least two of the group consisting of: an Sintersearch parameter, a Qqualmin parameter, and a Qrxlevmin parameter.

10. The method of claim 1, wherein the first broadcast channel, including the first cell reselection parameter is received over-the-air from the second access point.

11. The method of claim 1, wherein the access terminal wakeup interval information is received over-the-air from the second access point.

12. The method of claim 1, wherein the access terminal wakeup interval information is received from the second access point via a network backhaul.

13. The method of claim 1, wherein the first access point transmits the second broadcast channel, including the second cell reselection parameter via a broadcast channel.

14. The method of claim 1, further comprising retransmitting, by the first access point, the first broadcast channel, including the first cell reselection parameter, on the carrier frequency for another defined period of time that is based on the access terminal wakeup interval information.

15. The method of claim 14, wherein the retransmission of the first broadcast channel, including the first cell reselection parameter, by the first access point is triggered by the transmission of the second broadcast channel, including the second cell reselection parameter by the first access point.

16. The method of claim 1, wherein receiving a first broadcast channel further comprises receiving the first broadcast channel, including a third cell reselection parameter at the first access point, wherein the first broadcast channel, including the third cell reselection parameter, is associated with, and broadcast by, a third access point on the carrier frequency; and
further comprising:
   generating a fourth cell reselection parameter that is different from the third cell reselection parameter; and
   transmitting, by the first access point, a third broadcast channel, which is a clone of the first broadcast channel, wherein the third broadcast channel includes the fourth cell reselection parameter in place of the third cell reselection parameter on the carrier frequency for another defined period of time.

17. The method of claim 16, further comprising receiving, at the first access point, access terminal wakeup interval information associated with the third access point, wherein the another defined period of time is based on the access terminal wakeup interval information associated with the third access point.

18. The method of claim 1, wherein receiving a first broadcast channel further comprises receiving the first broadcast channel, including a third cell reselection parameter at the first access point, wherein the first broadcast channel, including the third cell reselection parameter is associated with, and broadcast by, a third access point on another carrier frequency;
   generating a fourth cell reselection parameter that is different from the third cell reselection parameter; and
   transmitting, by the first access point, the second broadcast channel, which is a clone of the first broadcast channel, wherein the second broadcast channel includes the fourth cell reselection parameter in place of the third cell reselection parameter on the another carrier frequency for another defined period of time.

19. The method of claim 18, further comprising receiving, at the first access point, access terminal wakeup interval information associated with the third access point, wherein the another defined period of time is based on the access terminal wakeup interval information associated with the third access point.

20. The method of claim 1, wherein:
the first access point comprises a femto cell; and
the second access point comprises a macro cell.

21. The method of claim 1, wherein the first access point operates on a second carrier frequency to provide service for access terminals.

22. The method of claim 1 wherein the second broadcast channel transmitted by the first access point is configured to cause an access terminal, upon receipt, to apply the second cell reselection parameters and discover the first access point.

23. The method of claim 1 wherein the second broadcast channel is a clone of the first broadcast channel wherein:
the second broadcast channel is nearly identical to the first broadcast channel, and
the second broadcast channel is configured by the first access point such that an access terminal cannot distinguish between the first broadcast channel, including the first cell reselection parameter, and the second broadcast channel, including the second cell reselection parameter.

24. An apparatus for communication, comprising:
a controller configured to receive a first broadcast channel, including a first cell reselection parameter at a first access point, wherein:
the first broadcast channel, including the first cell reselection parameter is associated with, and broadcast by, a second access point on a carrier frequency,
the second access point provides access over an area larger than the first access point,
the controller is further configured to receive access terminal wakeup interval information at the first access point,
the access terminal wakeup interval information is associated with the second access point, and
the controller is further configured to generate a second cell reselection parameter that is different from the first cell reselection parameter; and
a transmitter configured to transmit a second broadcast channel, which is a clone of the first broadcast channel, wherein the second broadcast channel includes the second cell reselection parameter in place of the first cell reselection parameter on the carrier frequency for a defined period of time that is based on the access terminal wakeup interval information.

25. The apparatus of claim 24, wherein the access terminal wakeup interval information specifies a discontinuous reception (DRX) cycle.

26. The apparatus of claim 25, wherein the defined period of time is longer than the DRX cycle.

27. The apparatus of claim 26, wherein the defined period of time is shorter than 105% of the DRX cycle.

28. The apparatus of claim 24, wherein:
the first cell reselection parameter comprises an Sintersearch parameter having a first value; and
the second cell reselection parameter comprises an Sintersearch parameter having a second value that is higher than the first value.

29. The apparatus of claim 24, wherein:
the first cell reselection parameter comprises a Qqualmin parameter having a first value; and
the second cell reselection parameter comprises a Qqualmin parameter having a second value that is different from the first value.

30. The apparatus of claim 24, wherein:
the first cell reselection parameter comprises a Qrxlevmin parameter having a first value; and
the second cell reselection parameter comprises a Qrxlevmin parameter having a second value that is different from the first value.

31. The apparatus of claim 24, wherein:
the controller is further configured to receive at least one other first cell reselection parameter included in the first broadcast channel at the first access point, wherein the at least one other first cell reselection parameter is associated with, and broadcast by, the second access point on the carrier frequency;
the controller is further configured to generate at least one other second cell reselection parameter that is different from the at least one other first cell reselection parameter; and
the transmitter is further configured to transmit the second broadcast channel, which is a clone of the first broadcast channel, wherein the second broadcast channel includes the at least one other second cell reselection parameter in place of the at least one other first cell reselection parameter on the carrier frequency for the period of time that is based on the access terminal wakeup interval information.

32. The apparatus of claim 31, wherein the first cell reselection parameter and the at least one other first cell reselection parameter collectively comprise at least two of the group consisting of: an Sintersearch parameter, a Qqualmin parameter, and a Qrxlevmin parameter.

33. The apparatus of claim 24, wherein the first broadcast channel, including the first cell reselection parameter is received over-the-air from the second access point.

34. The apparatus of claim 24, wherein the access terminal wakeup interval information is received over-the-air from the second access point.

35. The apparatus of claim 24, wherein the access terminal wakeup interval information is received from the second access point via a network backhaul.

36. The apparatus of claim 24, wherein the first access point transmits the second broadcast channel, including the second cell reselection parameter via a broadcast channel.

37. The apparatus of claim 24, wherein the transmitter is further configured to retransmit the first broadcast channel, including the first cell reselection parameter, on the carrier frequency for another defined period of time that is based on the access terminal wakeup interval information.

38. The apparatus of claim 37, wherein the retransmission of the first broadcast channel, including the first cell reselection parameter by the first access point is triggered by the transmission of the second broadcast channel, including the second cell reselection parameter by the first access point.

39. The apparatus of claim 24, wherein the controller being configured to receive a first broadcast channel further comprises the controller being configured to receive the first broadcast channel, including a third cell reselection parameter at the first access point, wherein the third cell reselection parameter is associated with, and broadcast by, a third access point on the carrier frequency; and wherein:
the controller is further configured to generate a fourth cell reselection parameter that is different from the third cell reselection parameter; and
the transmitter is further configured to transmit a third broadcast channel, which is a clone of the first broadcast channel, where in the third broadcast channel includes the fourth cell reselection parameter in place of the third cell reselection parameter on the carrier frequency for another defined period of time.

40. The apparatus of claim 39, wherein:
the controller is further configured to receive access terminal wakeup interval information associated with the third access point; and the another defined period of time is based on the access terminal wakeup interval information associated with the third access point.

41. The apparatus of claim 24, wherein the controller being configured to receive a first broadcast channel further comprises the controller being configured to receive the first broadcast channel, including a third cell reselection parameter at the first access point, wherein the first broadcast channel, including the third cell reselection parameter is associated with, and broadcast by, a third access point on another carrier frequency;
the controller is further configured to generate a fourth cell reselection parameter that is different from the third cell reselection parameter; and
the transmitter is further configured to transmit the second broadcast channel, which is a clone of the first broadcast channel, wherein the second broadcast channel includes the fourth cell reselection parameter in place of the third cell reselection parameter on the another carrier frequency for another defined period of time.

42. The apparatus of claim 41, wherein:
the controller is further configured to receive access terminal wakeup interval information associated with the third access point; and
the another defined period of time is based on the access terminal wakeup interval information associated with the third access point.

43. The apparatus of claim 24, wherein:
the first access point comprises a femto cell; and
the second access point comprises a macro cell.

44. The apparatus of claim 24, wherein the first access point operates on a second carrier frequency to provide service for access terminals.

45. The apparatus of claim 24 wherein the second broadcast channel transmitted by the first access point is configured to cause an access terminal, upon receipt, to apply the second cell reselection parameters and discover the first access point.

46. The apparatus of claim 24 wherein the second broadcast channel is a clone of the first broadcast channel, wherein:
the second broadcast channel is nearly identical to the first broadcast channel, and
the second broadcast channel is configured by the first access point such that an access terminal cannot distinguish between the first broadcast channel, including the first cell reselection parameter, and the second broadcast channel, including the second cell reselection parameter.

47. An apparatus for communication, comprising:
means for receiving a first broadcast channel, including a first cell reselection parameter at a first access point, wherein
the first broadcast channel, including the first cell reselection parameter is associated with, and broadcast by, a second access point on a carrier frequency, and
the second access point provides access over an area larger than the first access point;
means for receiving access terminal wakeup interval information at the first access point, wherein the access terminal wakeup interval information is associated with the second access point;
means for generating a second cell reselection parameter that is different from the first cell reselection parameter; and
means for transmitting a second broadcast channel, which is a clone of the first broadcast channel, where in the second broadcast channel includes the second cell reselection parameter in place of the first cell reselection parameter on the carrier frequency for a defined period of time that is based on the access terminal wakeup interval information.

48. The apparatus of claim 47, wherein the access terminal wakeup interval information specifies a discontinuous reception (DRX) cycle.

49. The apparatus of claim 48, wherein the defined period of time is longer than the DRX cycle.

50. The apparatus of claim 47, wherein:
the first cell reselection parameter comprises an Sintersearch parameter having a first value; and
the second cell reselection parameter comprises an Sintersearch parameter having a second value that is higher than the first value.

51. The apparatus of claim 47, wherein:
the first cell reselection parameter comprises a Qqualmin parameter having a first value; and
the second cell reselection parameter comprises a Qqualmin parameter having a second value that is different from the first value.

52. The apparatus of claim 47, wherein:
the first cell reselection parameter comprises a Qrxlevmin parameter having a first value; and
the second cell reselection parameter comprises a Qrxlevmin parameter having a second value that is different from the first value.

53. The apparatus of claim 47, further comprising means for retransmitting the first broadcast channel, including the first cell reselection parameter by the first access point on the carrier frequency for another defined period of time that is based on the access terminal wakeup interval information.

54. The apparatus of claim 53, wherein the retransmission of the first broadcast channel, including the first cell reselection parameter by the first access point is triggered by the transmission of the second broadcast channel, including the second cell reselection parameter by the first access point.

55. The apparatus of claim 47 wherein the second broadcast channel transmitted by the first access point is configured to cause an access terminal, upon receipt, to apply the second cell reselection parameters and discover the first access point.

56. The apparatus of claim 47 wherein the second broadcast channel is a clone of the first broadcast channel, wherein:
the second broadcast channel is nearly identical to the first broadcast channel, and
the second broadcast channel is configured by the first access point such that an access terminal cannot distinguish between the first broadcast channel, including the first cell reselection parameter, and the second broadcast channel, including the second cell reselection parameter.

57. A computer-program product, comprising:
a non-transitory computer-readable medium comprising code for causing a computer to:
receive a first broadcast channel, including a first cell reselection parameter at a first access point, wherein
the first broadcast channel, including the first cell reselection parameter is associated with, and broadcast by, a second access point on a carrier frequency, and
the second access point provides access over an area larger than the first access point;
receive access terminal wakeup interval information at the first access point, wherein the access terminal wakeup interval information is associated with the second access point;
generate a second cell reselection parameter that is different from the first cell reselection parameter; and
transmit, by the first access point, a second broadcast channel, which is a clone of the first broadcast channel, wherein the second broadcast channel includes the second cell reselection parameter in place of the first cell reselection parameter on the carrier frequency for a defined period of time that is based on the access terminal wakeup interval information.

58. The computer-program product of claim 57, wherein the access terminal wakeup interval information specifies a discontinuous reception (DRX) cycle.

59. The computer-program product of claim 58, wherein the defined period of time is longer than the DRX cycle.

60. The computer-program product of claim 57, wherein:
the first cell reselection parameter comprises an Sintersearch parameter having a first value; and
the second cell reselection parameter comprises an Sintersearch parameter having a second value that is higher than the first value.

61. The computer-program product of claim 57, wherein:
the first cell reselection parameter comprises a Qqualmin parameter having a first value; and
the second cell reselection parameter comprises a Qqualmin parameter having a second value that is different from the first value.

62. The computer-program product of claim 57, wherein:
the first cell reselection parameter comprises a Qrxlevmin parameter having a first value; and
the second cell reselection parameter comprises a Qrxlevmin parameter having a second value that is different from the first value.

63. The computer-program product of claim 57, wherein the computer-readable medium further comprises code for causing the computer to retransmit, by the first access point, the first broadcast channel, including the first cell reselection parameter on the carrier frequency for another defined period of time that is based on the access terminal wakeup interval information.

64. The computer-program product of claim 63, wherein the retransmission of the first broadcast channel, including the first cell reselection parameter by the first access point is triggered by the transmission of the second broadcast channel, including the second cell reselection parameter by the first access point.

65. The computer-program product of claim 57 wherein the second broadcast channel transmitted by the first access point is configured to cause an access terminal, upon receipt, to apply the second cell reselection parameters and discover the first access point.

66. The computer-program product of claim 57 wherein the second broadcast channel is a clone of the first broadcast channel, wherein:
the second broadcast channel is nearly identical to the first broadcast channel, and
the second broadcast channel is configured by the first access point such that an access terminal cannot distinguish between the first broadcast channel, including the first cell reselection parameter, and the second broadcast channel, including the second cell reselection parameter.

* * * * *